(12) United States Patent
Mock et al.

(10) Patent No.: US 8,007,182 B2
(45) Date of Patent: Aug. 30, 2011

(54) ASYMMETRICAL TRIPLE-ROW ANTI-FRICTION BEARING

(75) Inventors: Christian Mock, Schweinfurt (DE);
Peter Niebling, Bad Kissingen (DE);
Berthold Krautkraemer, Gochsheim (DE); Ralf Heiss, Schweinfurt (DE);
Kay Schumacher, Gochsheim (DE)

(73) Assignee: Schaeffler KG, Herzogenaurach (DE)

( * ) Notice: Subject to any disclaimer, the term of this patent is extended or adjusted under 35 U.S.C. 154(b) by 449 days.

(21) Appl. No.: 12/162,746

(22) PCT Filed: Jan. 16, 2007

(86) PCT No.: PCT/DE2007/000056
§ 371 (c)(1),
(2), (4) Date: Aug. 28, 2008

(87) PCT Pub. No.: WO2007/087775
PCT Pub. Date: Aug. 9, 2007

(65) Prior Publication Data
US 2009/0010586 A1 Jan. 8, 2009

(30) Foreign Application Priority Data
Jan. 31, 2006 (DE) .......................... 10 2006 004 297

(51) Int. Cl.
*F16C 19/18* (2006.01)

(52) U.S. Cl. .......................... 384/544; 384/494; 384/512
(58) Field of Classification Search .................. 384/494, 384/504, 512, 544, 589
See application file for complete search history.

(56) References Cited

U.S. PATENT DOCUMENTS

| 610,961 | A | * | 9/1898 | Davies | 384/504 |
| 859,374 | A | * | 7/1907 | Dickinson | 384/544 |
| 6,769,809 | B2 | * | 8/2004 | Maret | 384/512 |
| 2005/0111771 | A1 | | 5/2005 | Shevket | |

FOREIGN PATENT DOCUMENTS

| DE | 10331936 A1 * | 2/2005 |
| DE | 10 2004 020851 | 11/2005 |
| EP | 1 443 228 | 8/2004 |
| WO | WO 9317251 A1 * | 9/1993 |

* cited by examiner

*Primary Examiner* — Thomas R Hannon
(74) *Attorney, Agent, or Firm* — Lucas & Mercanti, LLP

(57) ABSTRACT

The invention relates to an anti-friction bearing comprising a first bearing race, a second bearing race and a plurality of anti-friction bodies that are located between the first bearing race and the second bearing race. According to the invention, the anti-friction bearings are arranged in several rows, which are asymmetrical in the longitudinal direction of the anti-friction bearing in relation to any plane that runs perpendicularly to said longitudinal direction of the anti-friction bearing.

14 Claims, 4 Drawing Sheets

ASYMMETRICAL TRIPLE-ROW ANTI-FRICTION BEARING

FIELD OF THE INVENTION

The present invention is aimed at an asymmetrical anti-friction bearing and in particular at a multi-row asymmetrical anti-friction bearing.

The invention is described with reference to a wheel bearing unit for driven or non-driven wheels of motor vehicles, such as for example of pickup trucks, light tucks or SUVs (sports utility vehicles). It is also pointed out that the present invention may also be used in other anti-friction bearings.

The prior art discloses anti-friction bearings which have an outer ring, an inner ring and rolling bodies arranged between said outer ring and inner ring. It is also known from the prior art to arrange said rolling bodies in two or more rows. In this way, it is possible to distribute the loads acting on the bearing between a plurality of rows of rolling bodies and thus between a plurality of rolling bodies.

In many applications, however, the bearing center of the respective wheel bearing and the wheel action line do not correspond to one another. For example, it is possible in a wheel suspension of a vehicle that the center of contact of the wheel or tire lies toward the outside in relation to the bearing center of the vehicle. In this case, forces are applied non-uniformly to the bearing.

The present invention is therefore based on the problem of providing an anti-friction bearing which is capable of absorbing even non-uniform forces which are caused for example by the bearing center and the lines of force action not coinciding. This is achieved according to the invention by means of an anti-friction bearing according to claim 1.

Advantageous embodiments and refinements are the subject matter of the subclaims.

The anti-friction bearing according to the invention has a first bearing ring and a second bearing ring and a plurality of rolling bodies arranged between the first bearing ring and the second bearing ring. Here, according to the invention, the rolling bodies are arranged in a plurality of rows, with the rows being arranged asymmetrically in the longitudinal direction of the anti-friction bearing about an arbitrary plane which is perpendicular to the longitudinal direction of the anti-friction bearing. Conventional bearings are typically designed such that the rolling body rows are symmetrical with respect to one another about a central plane. In the anti-friction bearing according to the invention, such a geometric plane, about which the rows are arranged symmetrically, cannot be formed. Here, a row is to be understood to mean that the rolling bodies are arranged substantially annularly between the inner ring and the outer ring.

In one preferred embodiment, the plane about which the rolling bodies are arranged asymmetrically is a central plane of the anti-friction bearing. This means that the plane, also referred to below as the central plane, divides the anti-friction bearing into two halves which are of substantially equal length in the longitudinal direction.

The number of rows is preferably uneven. This means that particularly preferably more rows are arranged on the one side of the central plane than on the other side of the central plane, and therefore the number of rows about said central plane is uneven.

In a further preferred embodiment, at least three rows are provided. In one advantageous embodiment of the anti-friction bearing with three rows, two rows of rolling bodies are situated on one side of the plane and one row is situated on the other side of the plane.

The pitch circle diameters of at least two rows preferably differ. In this case, the anti-friction bearing is preferably formed asymmetrically with respect to said central plane, also in terms of the pitch circle diameters of the individual rows. A pitch circle diameter is to be understood to mean the spacing between the central point of one rolling body and the central point of the rolling body which is situated exactly opposite.

The row with the larger pitch circle diameter offers larger areas for absorbing forces and can thus absorb a greater force and it is therefore possible by means of the different pitch circle diameters to allow for the fact that forces act on the anti-friction bearing outside the bearing center.

In one preferred embodiment, the pitch circle diameter of at least one row which is situated at the outside with respect to the anti-friction bearing is greater than each of the pitch circle diameters of one of the other rows. This means that an outer row has a greater pitch circle diameter than the other rows. Said outer row can thereby also absorb the greatest forces. The row with the greatest pitch circle diameter is preferably arranged relative to the bearing center on that side at which the eccentric forces also act on the wheel bearing.

The axial spacing between a first row and a second row which is spaced apart from said first row is preferably smaller than the axial spacing between the second row and a third row which is adjacent to said second row. Here, two rows are preferably arranged on one side with respect to a bearing center, and the third row, that is to say the row with the greater spacing, is arranged on the other side of the bearing center. It is therefore preferably possible for the two rows which are arranged on the one side of the bearing center to absorb greater forces, and said two rows are preferably arranged on that side with respect to the bearing center at which the greater forces are applied to the anti-friction bearing.

In a further preferred embodiment, the pitch circle diameter of a flange-side outer row is greater than each of the pitch circle diameters of one of the other rows. A flange-side outer row is to be understood to mean that row which is arranged closest to the flange of the wheel carrier to which the wheel rim and the tire are fastened. The flange-side outer row is therefore the row situated to the outside of the vehicle. Said embodiment is selected if the center of contact of the wheel lies toward the outside of the vehicle in relation to the bearing center. It would also be possible in this case to provide more rows on the side situated closest to the flange with respect to the central plane than on the side situated closest to the carrier. It is however also possible for the center of contact of the wheel to lie toward the inside of the vehicle—also referred to below as the carrier side—in relation to the bearing center. In this case, the pitch circle diameter of the carrier-side outer row would preferably be selected to be greater than each of the pitch circle diameters of one of the other rows. In this case, also with respect to the central plane, more rows could be arranged at the carrier side than at the flange side.

In a further advantageous embodiment, the outer ring has a predefined flange-side outer diameter and a carrier-side outer diameter which differs from said flange-side outer diameter. This means that the diameter of the outer ring also varies along the length of the anti-friction bearing. By means of said embodiment, it can be obtained that a certain wall thickness of the outer ring can be maintained even in the event of pitch circle diameters of different size.

In a further advantageous embodiment, the rolling bodies are selected from a group of rolling bodies which comprises balls, cylindrical rollers, cones and the like. Here, it is possible for the same generic type of rolling bodies, for example balls, to be arranged in all the rows of a bearing. However, it is also possible for different rows of the anti-friction bearing to be fitted with different generic types of rolling bodies, for example one row fitted with balls and a further row fitted with cylindrical rollers. In this way, it is possible in an optimum fashion to allow for the force conditions acting on the anti-friction bearing.

In a further preferred embodiment, the diameters of the rolling bodies of at least two rows are different. For example, it is possible for rows which have a larger pitch circle diameter to also be fitted with rolling bodies with a greater diameter. Conversely, it would also be possible to select the rolling bodies of all the rows to have the same diameter, as a result of which it would be necessary to arrange a higher number of rolling bodies in the rows with the greater pitch circle diameter.

The rolling bodies with the greater diameter are preferably provided in the outer rows arranged in each case at the flange side or at the carrier side.

In a further embodiment, all the rows have the same pressure angle. The pressure angle is determined here with respect to the longitudinal direction or the rotational axis of the bearing. This means that the raceways in the outer and inner rings are arranged such that the transmission of force takes place at substantially the same angle with respect to the rotational axis of the bearing in all the rows.

However, the pressure angles of at least two rows are preferably selected to be different. It is possible by means of the selection of this pressure means, too, to adapt the wheel bearing to the respective requirements, that is to say to the forces to be absorbed in each case or the directions thereof. The pressure angles of the outer rows are preferably greater than the pressure angles of the inner rows.

In a further preferred embodiment, at least one bearing ring is formed in two parts. Said bearing ring is preferably the inner bearing ring, the one part of which carries the raceways for two rows of rolling bodies and the second part of which carries a raceway for the remaining row.

Here, it is possible for the respective bearing ring halves to be braced against one another by means of a rim collar. The central plane preferably lies between the bearing ring halves. The division of the inner bearing ring into two bearing ring halves facilitates its assembly.

It is also possible to provide only one inner ring half with raceways for some of the rows, and to provide the raceways for the remaining rows directly on a flange body which is preferably rotatable with respect to the outer ring.

In a further preferred embodiment, the anti-friction bearing has a device for measuring the wheel rotational speed. Said device may for example be a magnetic disk which outputs an alternating signal to a sensor as a result of a rotation.

The present invention is also aimed at a wheel carrier having an anti-friction bearing of the above-described type.

Further advantages and embodiments can be gathered from the appended drawings, in which.

Figure 1:
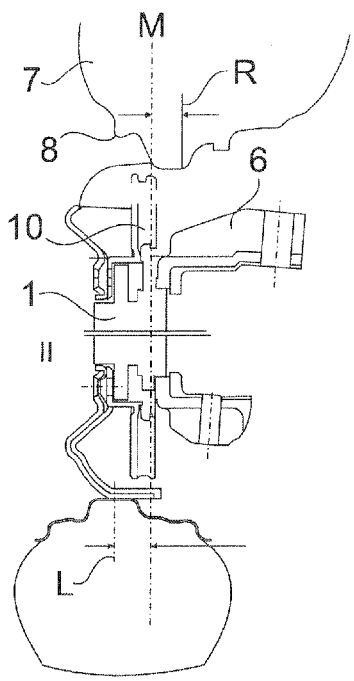
FIG. 1 is a schematic illustration showing the problem on which the invention is based.

FIG. 1 is a schematic illustration showing the problem on which the invention is based. Here, the reference numeral 1 relates to a wheel bearing which is not illustrated in full detail. Said wheel bearing has a bearing center M. In the upper partial Figure I, a tire 7 which is arranged on a wheel rim 8 is displaced laterally to the right with respect to said bearing center M, as indicated by the line R. The tire in the upper Figure part I is therefore displaced in the direction of a wheel carrier 6 with respect to the bearing center M. The center of contact of the wheel is therefore situated toward the inside of the vehicle relative to the bearing center M.

This has the result that forces acting on the wheel or the tire 7 are transmitted via the bearing not centrally but rather laterally offset with respect thereto. In this way, the bearing is subjected to a greater loading on the side which faces toward the wheel carrier 6 than on the other side. In the lower Figure part II, the center of contact of the wheel lies toward the outside of the vehicle relative to the bearing center M, as indicated by the line of force action L. In this case, that side of the bearing which is situated toward the outside of the vehicle with respect to the bearing center M is subjected to a greater loading. The reference numeral 10 relates to a brake disk.

Figure 2:
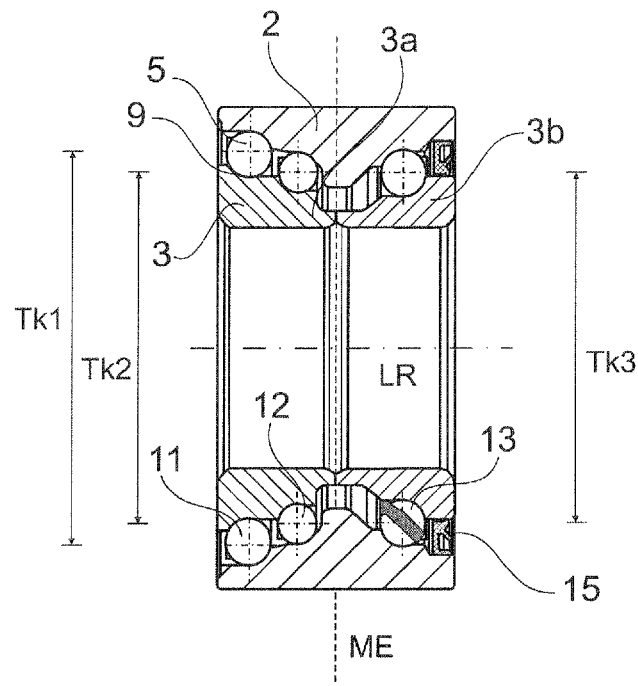
FIG. 2 shows an anti-friction bearing according to the invention in a first embodiment.

FIG. 2 shows an anti-friction bearing according to the invention in a first embodiment. Said anti-friction bearing has an outer bearing ring 2 and an inner bearing ring 3. In the embodiment shown in FIG. 1, the inner bearing ring 3 is formed in two parts and has two inner ring halves 3a and 3b.

The anti-friction bearing shown in FIG. 2 has three rows 11, 12 and 13, in each of which are arranged rolling bodies 5. Here, the rolling bodies 5 are arranged in each case in rings and run in planes perpendicular to the plane of the Figure.

The individual rolling bodies (5) may run in bearing cages (not shown in detail). The reference numeral 15 relates to sealing devices for sealing off the anti-friction bearing 1.

As a result of said asymmetrical arrangement of the rows, the bearing can absorb the above-mentioned non-uniform forces. Greater forces can be absorbed at the side at which a plurality of rows of rolling bodies are arranged, and it is thereby possible for eccentric forces acting on the bearing to be counteracted.

The reference symbol ME relates to a central plane which is perpendicular to the plane of the Figure. The rows are asymmetrical in the longitudinal direction LR of the bearing about said central plane ME, that is to say the two rows 11 and 12 are situated at the left-hand side of said central plane ME and the row 13 is situated at the right-hand side. In principle, however, said asymmetrical arrangement of the rows would also be possible with an even number of rows, for example with three rows arranged on one side of the central plane and only one arranged on the other side. It can also be seen that the spacing of the rows 11 and 12 in the longitudinal direction LR is smaller than the spacing between the row 12 and the row 13 in the longitudinal direction LR. The rows 11 and 12 are therefore arranged in tandem formation.

As shown in FIG. 2, the individual rows 11, 12 and 13 have different pitch circle diameters (Tk1, Tk2, Tk3) which, as mentioned in the introduction, result from the spacing from a rolling body center of one rolling body to an opposite rolling body, and there in turn to the rolling body center of the latter.

In the embodiment shown in FIG. 2, the row 11 has the greatest pitch circle diameter Tk1 and the row 13 has the smallest pitch circle diameter Tk3, with the pitch circle diameter Tk2 of the row 12 being only slightly greater than the pitch circle diameter Tk3. The rows 11 and 12 at the vehicle outside or at the flange side therefore always have a greater sum total of pitch circle diameters than the row 13 at the carrier side.

The anti-friction bearing shown in FIG. 2 is therefore particularly suitable for situations in which the center of contact of the wheel is situated toward the outside of the vehicle, or flange side, relative to the bearing center. As a result of the dimensional ratios of the pitch circle diameters Tk1 and Tk2, a pitch circle diameter which decreases on average from the outside to the inside is obtained on the left-hand side with respect to the bearing center in FIG. 2. The spacing between the row 13 and the row 12 is considerably greater than the spacing between the row 11 and the row 12. In this way, the row 13 can at the same time be arranged relatively far outward with respect to the rolling bearing.

Figure 3:
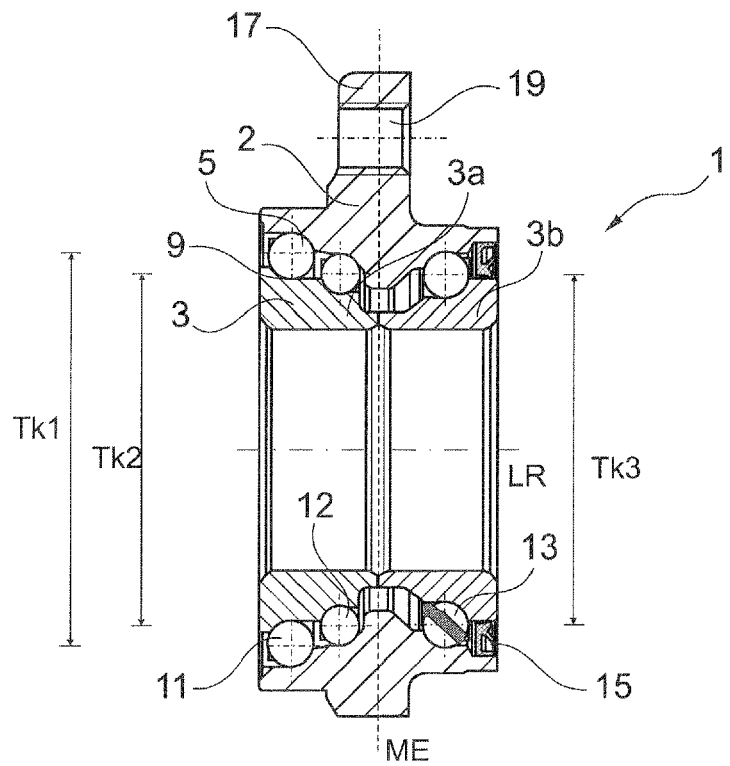
FIG. 3 shows an anti-friction bearing according to the invention in a second embodiment.

FIG. 3 shows a bearing arrangement according to the invention in a second embodiment. In contrast to the embodiment shown in FIG. 1, a flange 17, which has an opening 19, is arranged on the bearing ring 2 in this embodiment. Said flange may be connected to the carrier or to a wheel. The rolling bodies 5 of the individual rows 11, 12 and 13 have in each case different diameters, with the diameters of the outer rows 11 and 13 being greater than the diameter of the rolling bodies in the inner row 12 in this embodiment. It would however also be possible for the individual rolling bodies 5 of all the rows to have substantially the same rolling body diameter.

By means of the arrangement of the respective rows with the different pitch circle diameters Tk1, Tk2, and Tk3, as stated above, the eccentric introduction of load is counteracted, and both the resistance to tilting and also the load capacity of the bearing are increased.

Figure 4:
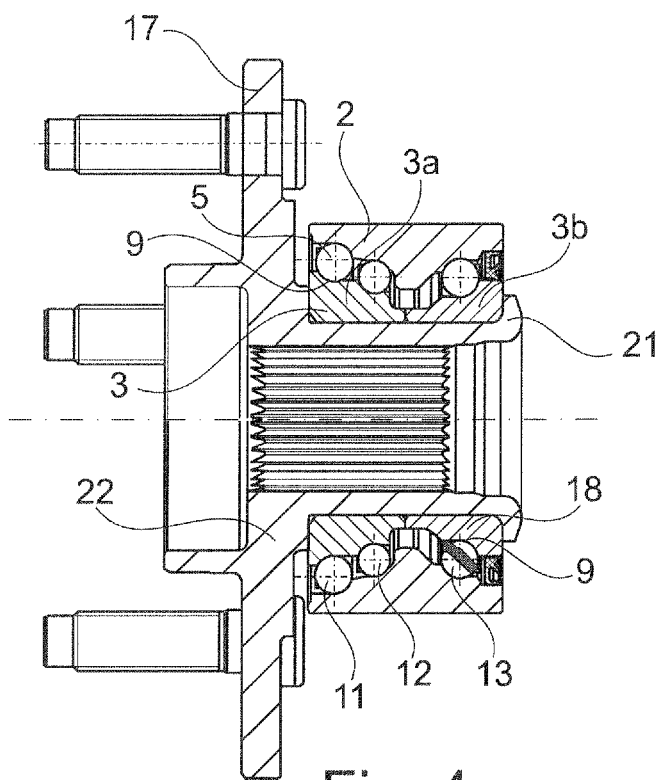
FIG. 4 shows an anti-friction bearing according to the invention in a third embodiment.

FIG. 4 shows a further embodiment of the bearing according to the invention. In contrast to the embodiment shown in FIG. 3, here, a flange 17 is arranged not on the outer ring but rather on a flange body 18 which is rotatable with respect to the outer ring. The two inner ring halves 3*a* and 3*b* are in each case held together, or braced axially, by means of a flanged edge 21 or flanged collar 21 on the one hand and a shoulder 22 on the other hand on the flange body 18. The inner ring 3 is or the inner ring halves 3*a* and 3*b* are thereby rotationally fixedly connected to the flange body 18. The inner ring half 3*a* has two raceways 9 for the rolling bodies of the rows 11 and 12 in the embodiment shown in FIG. 4. The inner ring half 3*b* has one raceway 9 for the rolling bodies of the row 13.

The embodiment of the inner bearing ring 3 in the form of two inner ring halves 3*a* and 3*b* is advantageous for assembly, since it is also possible in this way for the inner row 12 to be arranged easily.

Figure 5:
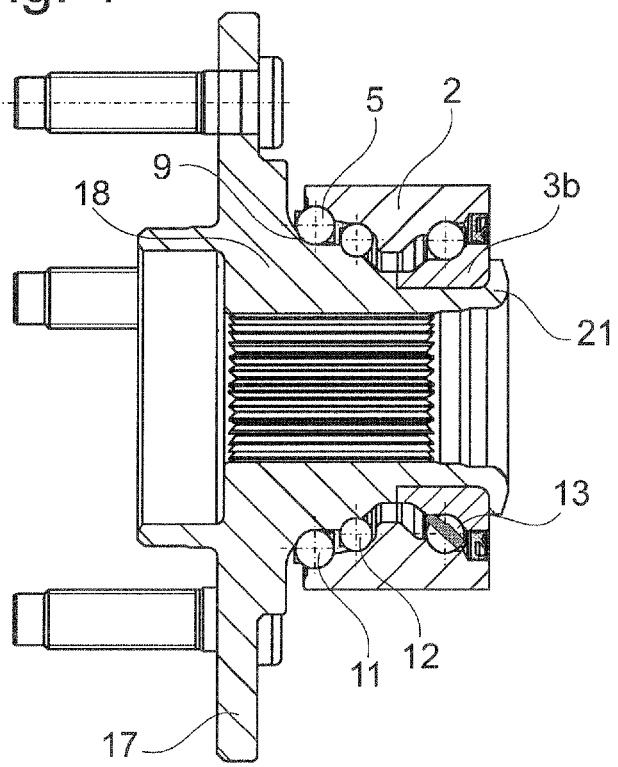
FIG. 5 shows an anti-friction bearing according to the invention in a fourth embodiment.

FIG. 5 shows a further embodiment of the anti-friction bearing according to the invention. In contrast to the embodiment shown in FIG. 4, here, the two inner ring halves 3*a* and 3*b* are not provided, but rather only the inner ring half 3*b*. The raceways 9 for the rolling bodies of the rows 11 and 12 are in this case arranged directly on the flange body 18. It can be seen that, in the embodiment shown in FIGS. 4 and 5, although the rolling bodies of the rows 11 and 13 are substantially of equal diameter, the pitch circle diameter of the row 13 is slightly smaller than the pitch circle diameter of the row 11. In this embodiment, too, the asymmetrical arrangement with respect to the central plane ME allows eccentric forces to be absorbed. The bearing ring half 3*b* is braced against the flange body 18 by means of the flanged collar 21 and thus axially secured against said flange body 18.

Figure 6:
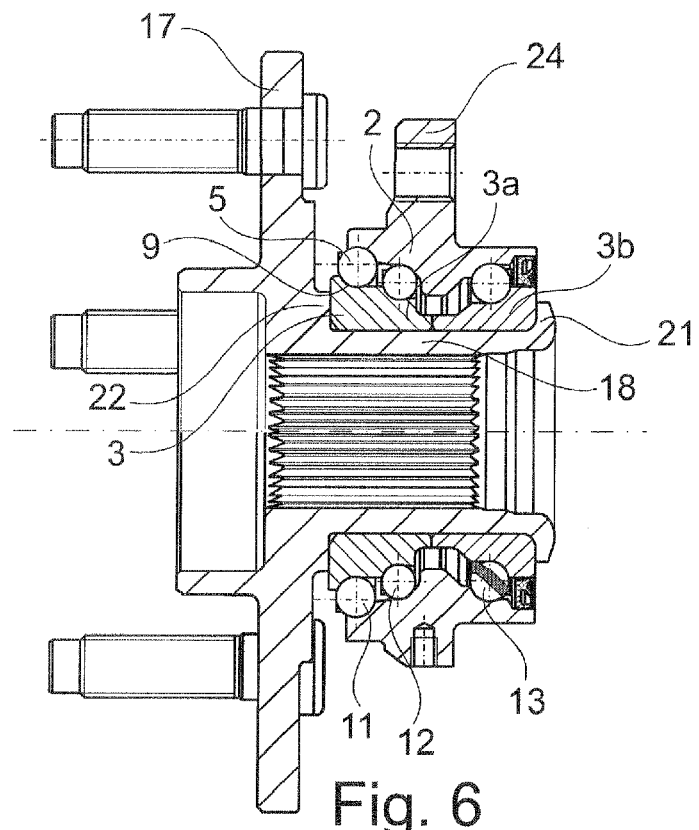
FIG. 6 shows an anti-friction bearing according to the invention in a fifth embodiment.

FIG. 6 shows a further embodiment of an anti-friction bearing according to the invention. Here, too, a flanged collar 21 is provided which presses the two inner ring halves 3*a* and 3*b* against the shoulder 22 of the flange body 18. In contrast to the embodiments shown in the preceding Figures, however, two flanges 17 and 24 are provided here, with the flange 24 being arranged on the outer bearing ring 2. It can also be seen that the diameter of the outer bearing ring 2 in the direction of the flange 17 is greater than the diameter in the direction of the wheel carrier (not shown), that is to say to the right in FIG. 6.

Figure 7:
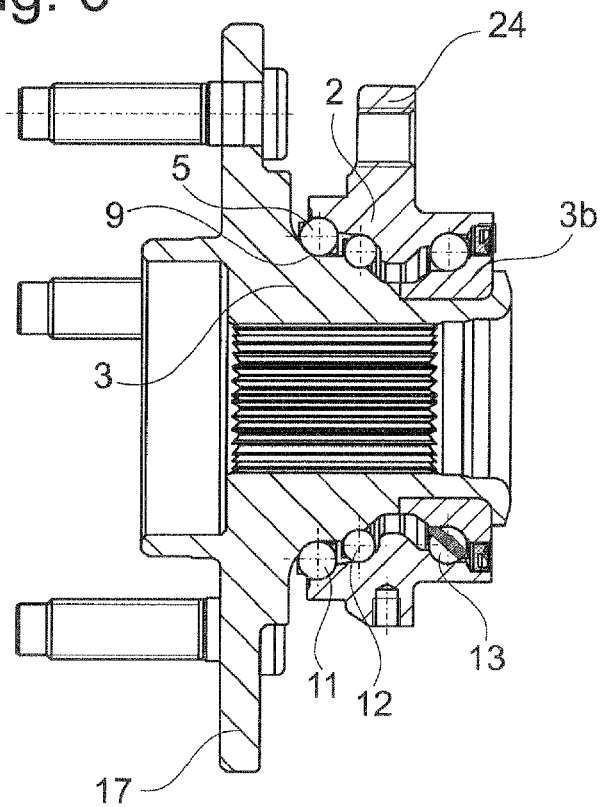
FIG. 7 shows an anti-friction bearing according to the invention in a sixth embodiment.

FIG. 7 shows a further embodiment of an anti-friction bearing according to the invention. Said embodiment is similar to that of FIG. 5, but with a second flange 24 being arranged on the outer bearing ring 2 here too.

Figure 8:
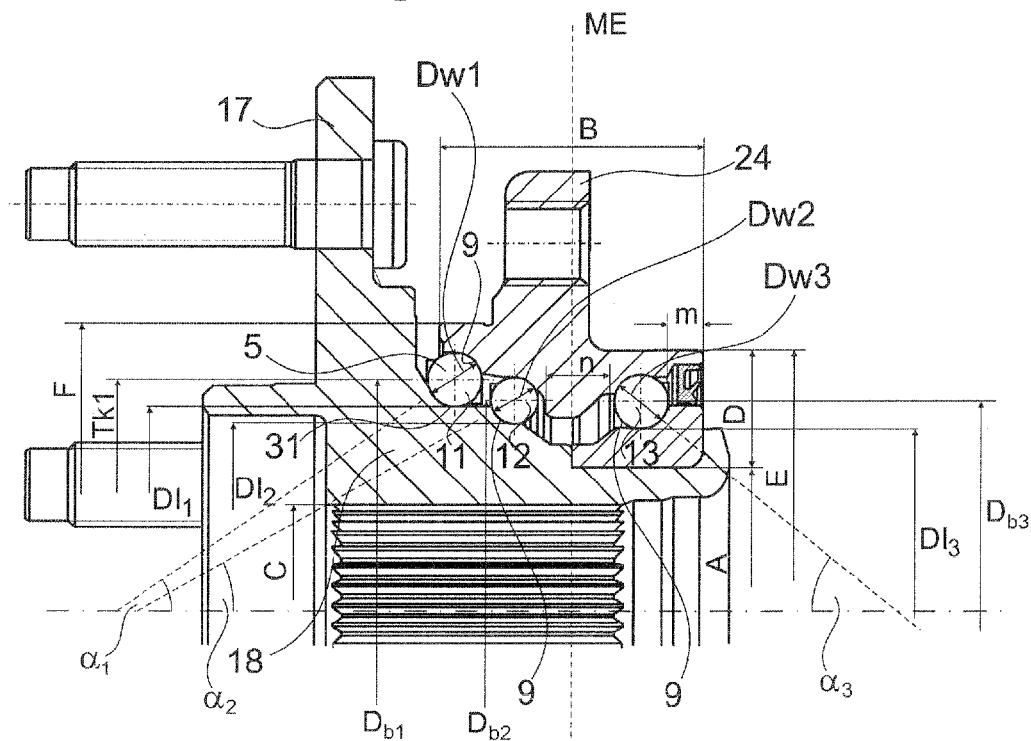
FIG. 8 shows an anti-friction bearing according to the invention in a seventh embodiment.

FIG. 8 shows a further embodiment of a bearing according to the invention for showing the geometries. In FIG. 8, the reference symbol B denotes the overall bearing width and the reference symbol D denotes the bearing height, that is to say the spacing between a radially inwardly pointing surface of the inner bearing ring 3 and a radially outwardly pointing surface of the outer bearing ring 2, neglecting the flange 24. The reference symbol F denotes the flange-side outer diameter of the outer ring and the reference symbol E denotes the outer diameter of the anti-friction bearing at the vehicle inside or carrier side.

The reference symbol A denotes the bore diameter of the anti-friction bearing. The reference symbols Dw denote the individual diameters of the respective rolling bodies; for example, the reference symbol Dw1 denotes the diameter of a rolling body 5 in the row 11. The reference symbols Tk1-Tk3 denote the individual pitch circle diameters of the respective rows, with only the reference symbol Tk1 being drawn in. The reference symbols Db1-Db3 denote the respective rim diameter of the individual rows.

The reference symbols D11-D13, although only the diameter D11 is shown, denote the respective raceway base diameter, and are measured from that section 31 of a raceway which lies radially at the inside. The reference symbol n denotes the width of the central rim between the rows 12 and 13.

The reference symbol m denotes the rim width of the inner ring or of the inner ring half 3*b* on that side which faces toward the carrier device (not shown). The reference symbols a1-a3 denote in each case the rim angle of the inner raceways 9.

Since the anti-friction bearing shown in FIG. 8 is also designed for the case in which the force is introduced into the wheel bearing from the outside with respect to the anti-friction bearing center, that is to say from the flange side, the geometric conditions described below apply in this case. The pitch circle diameter Tk1 of the row 11 is preferably greater than the pitch circle diameter Tk2 of the row 12. The pitch circle diameter Tk1 is also preferably greater than or equal to the pitch circle diameter Tk3 of the row 13. The pitch circle diameter Tk3 is greater than or equal to the pitch circle diameter Tk2 of the row 12. In addition, the flange-side outer diameter F is greater than the carrier-side diameter E (defined with respect to the longitudinal direction LR) and the pressure angle α3 of the row 13 is greater than or equal to the pressure angles α1 and α2 of the rows 11 and 12.

In the inverse embodiment, that is to say the embodiment in which the forces engage on the bearing offset with respect to the central line at the carrier side, the pressure angle α1 of the row 11 would, conversely, be greater than the two pressure angles of the rows 12 and 13.

In the inverse embodiment, the pitch circle diameter Tk3 would also be greater than the pitch circle diameter Tk2, and the pitch circle diameter Tk3 would be greater than or equal to the pitch circle diameter Tk1. In this case, the carrier-side outer diameter E of the outer ring would be greater than the flange-side outer diameter F. It is however pointed out that, in the embodiment described here, all the pitch circle diameters could also be selected to be of equal size, since as a result of the asymmetrical arrangement of the rows, that is to say the arrangement of two rows on the one side of the central plane ME and only one row on the other side, higher forces can be absorbed in any case on the side with the two rows.

In the embodiment shown in FIG. 8, the overall bearing width B is greater than the sum of all the rolling body diameters plus the rim width of the inner ring m and the central rim width n. In addition, the overall hearing width is greater than 28 mm.

In the embodiment shown in FIG. 8, the outer diameter of the outer ring E at the vehicle inside or at the carrier side is greater than the sum of the pitch circle diameter Tk3 and the diameter Dw3 of the rolling bodies of the row 13. The carrier-side outer diameter E is preferably at least 6 mm greater than the sum stated above of the pitch circle diameter Tk3 and the diameter Dw3.

The pitch circle diameter Tk3 is preferably at least 3.5 mm greater than the bore diameter A. The flange-side outer diameter F is greater than the pitch circle diameter Tk1 of the row 11 plus the rolling body diameter Dw1. The carrier-side outer diameter E is preferably at least 6 mm greater than the stated sum of the pitch circle diameter Tk1 and the rolling body diameter Dw1. Furthermore, in the embodiment shown in FIG. 8, the respective rim angles $\alpha_1$ and $\alpha_3$ of the raceways 11 and 13 are greater than or equal to the rim angles $\alpha_2$ of the central raceway of the row 12. Here, the angles are specified in relation to the bearing longitudinal axis. This means that the pressure angles of the outer rows, that is to say the angles under which the forces are transmitted from the outer ring to the inner ring, are greater in the outer rows than the pressure angle of the inner row 12. It would however also be possible for the pressure angles of all the rows to be equal.

All the features disclosed in the application are claimed as being essential to the invention if novel, individually or in combination, over the prior art.

LIST OF REFERENCE SYMBOLS

1 Wheel hearing
2 Outer bearing ring
3 Inner bearing ring
3*a*, 3*h* Inner ring halves
5 Rolling bodies
6 Wheel carrier
7 Tire
8 Wheel rim
9 Raceway
10 Brake disk
11, 12, 13 Rows
15 Sealing device
17 Flange
18 Flange body
19 Opening
21 Flanged collar
22 Shoulder
24 Flange
31 Radially inner section of a raceway 9
A Bore diameter
B Overall hearing width
D Bearing height
E Vehicle-inner-side or carrier-side outer diameter
F Flange-side outer diameter
M Bearing center
ME Central plane
n Central rim width
m Rim width of the inner ring
R, L Lines of force action
Db1-Db3 Rim diameter of the individual rows
D11-D13 Raceway base diameter
Dw1-Dw3 Diameter of the respective rolling bodies
Tk1-Tk3 Pitch circle diameter
$\alpha_1$, $\alpha_2$, $\alpha_3$ Pressure angle
I, II Part—Figure (FIG. 1)
LR Longitudinal direction of the rolling body

The invention claimed is:

1. An anti-friction bearing, comprising:
a first bearing ring
a second bearing ring; and
a plurality of rolling bodies arranged between the first bearing ring and the second bearing ring,
wherein the rolling bodies are ball bearings arranged in an uneven number of rows and the rows are arranged asymmetrically in a longitudinal direction of the anti-friction bearing about an arbitrary plane which is perpendicular to the longitudinal direction of the anti-friction bearing, and
wherein the rolling bodies of each row have different diameters resulting in different pitch circle diameters for each of the rows.

2. The anti-friction bearing as claimed in claim 1, wherein the plane about which the rolling bodies are arranged asymmetrically is a central plane of the anti-friction bearing.

3. The anti-friction bearing as claimed in claim 1, wherein at least three rows are provided.

4. The anti-friction bearing as claimed in claim 1, wherein the pitch circle diameter of at least one row which is situated at the outside with respect to the anti-friction bearing is greater than each of the pitch circle diameters of one of the other rows.

5. The anti-friction bearing as claimed in claim 1, wherein the axial spacing between a first row and a second row which is adjacent to said first row is smaller than the axial spacing between the second row and a third row which is adjacent to said second row.

6. The anti-friction bearing as claimed in claim 1, wherein the pitch circle diameter of a carrier-side outer row is greater than each of the pitch circle diameters of one of the other rows.

7. The anti-friction bearing as claimed in claim 1, wherein the pitch circle diameter of a carrier-side outer row is greater than each of the pitch circle diameters of one of the other rows.

8. The anti-friction bearing as claimed in claim 1, wherein at least the first bearing ring has a predefined flange-side outer diameter and a carrier-side outer diameter which differs from said flange-side outer diameter.

9. The anti-friction bearing as claimed in claim 1, wherein the diameters of the rolling bodies of at least two rows are different.

10. The anti-friction bearing as claimed in claim 1, wherein all the rows have the same pressure angle.

11. The anti-friction bearing as claimed in claim 1, wherein at least one bearing ring is formed in two parts.

12. The anti-friction bearing as claimed in claim 1, wherein the raceways of at least one row are arranged on a flange body.

13. A wheel carrier having an anti-friction bearing as claimed in claim 1.

14. An anti-friction bearing, comprising:
a first bearing ring;
a second bearing ring; and a plurality of rolling bodies arranged between the first bearing ring and the second bearing ring,
wherein the rolling bodies are ball bearings arranged in an uneven number of rows and the rows are arranged asymmetrically in a longitudinal direction of the anti-friction bearing about an arbitrary plane which is perpendicular to the longitudinal direction of the anti-friction bearing,
wherein the rolling bodies of each row have different diameters resulting in different pitch circle diameters for each of the rows, and
wherein the pressure angles of at least two rows are different.

* * * * *